R. C. LEAKE.
AUTOMATIC SYNCHRONIZER.
APPLICATION FILED AUG. 10, 1906.
1,078,863.
Patented Nov. 18, 1913.
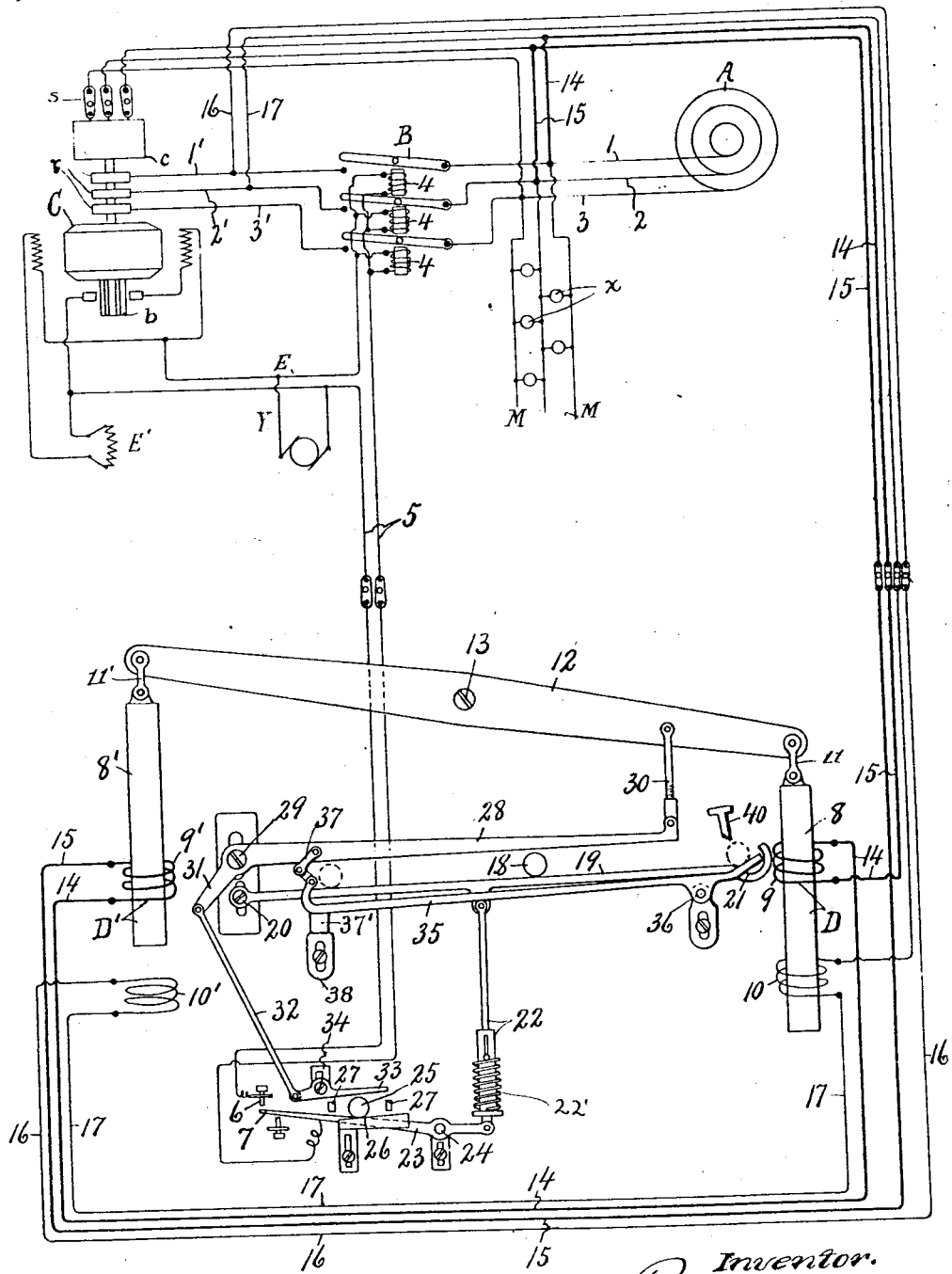
Witnesses.
A. C. Thomas
K. E. Chase
Inventor.
R. C. Leake
By.
Howard Druiden
Attorney.

UNITED STATES PATENT OFFICE.

RICHARD C. LEAKE, OF LAKELAND, NEW YORK, ASSIGNOR OF ONE-HALF TO SIMON B. STORER, OF SYRACUSE, NEW YORK.

AUTOMATIC SYNCHRONIZER.

1,078,863.　　　　　Specification of Letters Patent.　　Patented Nov. 18, 1913.

Application filed August 10, 1908.　Serial No. 447,780.

*To all whom it may concern:*

Be it known that I, RICHARD C. LEAKE, of Lakeland, in the county of Onondaga, in the State of New York, have invented new and useful Improvements in Automatic Synchronizers, of which the following, taken in connection with the accompanying drawings, is a full, clear, and exact description.

This invention relates to certain improvements in automatic synchronizers for rotary electrical machines which are adapted to be placed in electrical connection with each other for synchronous action when the revolving parts are approximately in step. This synchronizer is generally used in connection with an alternating current circuit having an electric switch connected therein between the rotary elements to be synchronized and it is, therefore, necessary to bring the speeds of the machines into such relation that their instantaneous voltage values and number of alternations per minute are approximately the same to prevent injury to any of the apparatus by excessive rush of current.

My object, therefore, is to provide means for automatically closing the switch to throw the machines into circuit at about the instant when the voltage values and alternations per minute are approximately the same.

A more specific object is to control the closing of the switch through the medium of one or more rolling members and a tilting support or supports therefor.

A further object is to control the tilting of the support and action of the rolling member lengthwise thereof by electrical means connected in circuit with the generator and rotary element to be synchronized therewith. In other words, I have sought to time the closing of the circuit between the rotary elements which are to be brought into synchronism by means of one or more rolling members, the action of which is dependent upon the degree of incline of a tilting support which in turn is controlled by the relative voltage values and number of alternations per minute of the two machines which are to be brought into synchronism.

Other objects and uses relating to specific parts of the synchronizing mechanism will be brought out in the following description.

In the drawings, I have shown diagrammatically an elevation of my improved synchronizing mechanism in connection with a diagrammatic view of an alternating current generator and a rotary converter together with an electric switch for closing the circuit between the generator and converter when the latter are brought approximately into step said switch being shown as open.

—A— represents an alternating current generator having, in this instance, three leads —1—, —2— and —3— which are adapted to be connected by an electric switch —B— to similar leads —1'—, —2'— and —3'— of a rotary converter C. The reference character —c— denotes a motor, —s— the switches for the motor, —r— indicates the slip rings of the rotary converter C, and —b— denotes the commutator. A main line adapted to be fed by the alternator is illustrated at M, with the lamps X in electrical connection.

A direct circuit adapted to be fed by the rotary converter is indicated at E and a motor Y is provided in this circuit. The motor —c— is an induction motor and is used to bring the rotary converter C up to synchronous speed with the alternator A at which time the automatic synchronizer will close switches B, and cut in line direct to the converter. After this takes place the switches —s— may be opened. The converter will continue to run from current supplied through switches B.

The switch —B— which is shown diagrammatically in its opened position is adapted to be closed by one or more electromagnets —4— or similar devices which are connected in an electric circuit —5— having normally separated contact terminals —6— and —7— adapted to be brought together when the two machines are approximately in step or rather when the voltage waves are increasing and decreasing under practically identical conditions for the purpose of closing the switch —B—.

The action of the generator and rotary converter are well understood by those skilled in the art and it is, therefore unnecessary to enter into any detailed description of the same, except to state that they are adapted to be electrically connected by the switch —B— when their instantaneous voltage values and number of alternations per minute are approximately the same so that the rotary converter may be driven by and in synchronism with the generator, it being understood that any means may be employed for rotating the converter to bring it to the proper speed for synchronous action and that the mechanism forming the subject matter of my present invention is equally useful in establishing synchronous action between the generator and one or more rotary motors.

In order to render the closing of the circuit —5— and switch —B— automatic, it is necessary to provide some suitable electrical device or devices which are sufficiently sensitive to be influenced by the slightest variations in the instantaneous values of the voltage waves or number of alternations per minute of the two machines which are to be synchronized and for this purpose I have provided two solenoids —D— and —D'—, each having movable plungers —8— and —8'— and each provided with separate windings —9— and —10— and —9'— and —10'— respectively, said plungers being flexibly connected by links —11— and —11'— to the opposite ends of a walking beam or lever —12— which is centrally pivoted upon a fixed support —13— substantially midway between the solenoids. The coils or windings —9— and —9'— of the opposite solenoids —D— and —D'— are electrically connected in series by wires —14— and —15— with the leads —1— and —2— of the generator —A— while the coils or windings —10— and —10'— are connected in series by wires —16— and —17— with the leads —1'— and —2'— of the rotary converter —C—. The coils —9— and —10— of the solenoid —D— are wound in the same direction to assist each other in their magnetic pull upon the core —8— when the two machines are approximately in step or rather when their instantaneous voltage values and number of alternations per minute are approximately the same thereby tending to operate the lever —12— in one direction. The coils or windings —9'— and —10'— of the solenoid are wound to oppose each other and, therefore, when the two machines are approximately in step as just described, the magnetic pull of each coil —9'— and —10'— upon the corresponding plunger or core —8'— is counteracted or neutralized by the other thereby leaving the plunger —8'— substantially free from any electrical influence. On the other hand, when the two machines are in opposition, it is evident that the magnetic pull of the coils —9— and —10— of the solenoid —D— will counteract each other and free the plunger —8— while the magnetic pull on the coils —9'— and 10' of the solenoid —D'— will be combined to exert magnetic pull upon the core or plunger —8'— thereby rocking the lever in the opposite direction. It, therefore, follows that during the operation of the two machines —A— and —C— under different speeds of or when the instantaneous voltage values and number of alternations per minute of the two machines are fluctuating, the lever —12— will be alternately rocked in opposite directions until they approach synchronism of movement, whereupon the movement of the lever —12— will become exceedingly slow in the direction of the solenoid —D— at which time the current is flowing in the same direction through both of the windings —9— and —10— and exert a combined magnetic pull upon the plunger —8— while the effect of the current in the windings of the opposite solenoid —D'— are neutralized one by the other as previously described. This oscillatory action of the lever —12— is utilized to partially control the closing of the switch circuit —5— through the medium of the contact terminals —6— and —7— but is not sufficiently delicate in its operation to be relied upon to close the switch at the proper time and for this purpose I have interposed between the lever —12— and contact terminals suitable timing mechanism whereby a short period of time will be allowed to close the switch when the two machines are brought into approximate synchronism of action and at the same time providing means to prevent the closing of the switch circuit by sudden fluctuations of load in either machine at the time when they are approaching synchronism of action. This timing mechanism consists primarily of a weighted rolling member —18— which rides upon a tiltable inclined track or way —19— which is pivoted at one end at —20— and is inclined slightly from a horizontal plane from its pivot toward its opposite end, the latter being provided with a suitable pocket —21— in which the ball rests when in its starting position or when the end of the lever —12— to which the plunger —8— is attached is elevated as will be hereinafter explained. This lever —19— is connected at one side of its pivot, in this instance, intermediate its ends to a pendant link —22— having its lower end pivotally connected to one end of a lever —23— which is fulcrumed at —24—, the opposite end of said lever forming the terminal —7— of the switch circuit —5— and is inclined slightly from a horizontal plane from its fulcrum —24—.

A rolling member —25— is adapted to rest upon the upper inclined face of the lever —23— and also adapted to rest upon an oppositely inclined bearing face —26— which is disposed in a plane intersecting that of the inclined upper face of the lever —23— between two limiting stops —27—, the latter serving to limit the rolling action of the member —25— along said inclined members, the relative connections between the levers —19— and —23— being such that when the lever —19— is depressed at the proper time, the terminal end of the lever —23— will be brought into contact with the terminal —6— to close the circuit —5— and thereby close the switch —B— to electrically connect the two machines.

A timing lever —28— is fulcrumed at one end at —29— directly above and in proximity to the fulcrum —20— of the lever —19— and extends in the same direction as said lever —19— a sufficient distance therefrom to permit the free action of the rolling member —18— along the incline —19—, the latter end of said lever being connected by a link —30— to the lever —12— between the fulcrum —13— and point of connection with the link —11— of the plunger —8—. The opposite end of the lever is provided with a comparatively short arm —31— which is connected by a link —32— to one end of a timing lever —33—, the latter being fulcrumed intermediate its ends at —34— directly above the lever —23— and support —26—, sufficient clearance being left for the free action of the rolling member —25— during the slow action of the lever —12— when the machines are approaching synchronism of action. This lever —33— coacts with the rolling member —25— to depress the lever —23— carrying the terminal —7— away from the contact —6— under quick or impulsive action of the walking beam —12— but to allow the rolling member —25— to roll down the incline of the lever —23— when the action of the walking beam is sufficiently slow to permit such rolling movement thereby allowing the terminals —7— to contact with the terminal —6— to close the switch circuit.

The rolling member —18— is expelled from its starting position in the pocket —21— upon the incline member —19— and returned along said inclined member by a lever —35— which is fulcrumed at —36— near the free end of the lever —19— and its opposite end is connected by a toggle —37— to the lever —28— some distance in advance of its fulcrum —29—, said lever —35— having a greater portion thereof disposed in an inclined position in close proximity to but slightly below the incline face of the lever —19— upon which the rolling member —18— rides and is usually slotted lengthwise to receive said lever —19—.

The relative weights of the rolling members —1— and —25— are so proportioned that when they are at their extreme starting positions, their respective levers are substantially balanced with the terminals —6— and —7— separated, and the lever —19— slightly inclined from its fulcrum toward its free end.

The lever —35— is movable with the lever —28— and walking beam —12— relative to the inclined support —19— for the rolling member —18—, the end of said lever —35— at the opposite side of its fulcrum —36—being deflected upwardly at a slightly greater incline and forming a tripping member to lift the rolling member —18— from its pocket —21— on to the inclined lever —19— when the plunger —8— descends slowly, the opposite end of said lever being depressed by the depression of the lever —28— through the medium of the toggle —37— or by its own gravity as the movement of the toggle —37— will allow.

The reference character 37' denotes an adjustable stop for that end of the lever 35 to which is connected the toggle 37. The stop 37' is adjustably connected to a supporting bracket 38'.

If the tripping end of the lever —35— is thrown up too suddenly the rolling member is thrown against a stop pin —40— and thereby prevented from rolling down the inclined lever —19—, the latter action taking place only when the plunger —8— and adjacent end of the lever —12— descends slowly. This allows the rolling member to roll along the incline —19— directly under the superposed lever —28— and inasmuch as the incline is slight the rolling action of the member —18— will be correspondingly slow toward the fulcrum —20—.

The speed and travel of the rolling member —18— is regulated by the incline of the lever —19— to correspond to a predetermined slowness of descent of the plunger —8— and corresponding end of the lever —12— necessary to allow the closing of the switch circuit without endangering any of the apparatus from undue rush of current. This rolling member —18— also serves as a means for transmitting motion from the lever —28— to the lever —19— and thence to the lever —23— through the medium of the link —22— so that if the descent of the plunger is sufficiently slow to enable the rolling member —18— to travel a predetermined distance along the lever —19— without interruption by the lever —28—, the movement of the lever —33— will also be sufficiently slow to allow the rolling member —25— to roll away from the left hand stop —27— along the inclined lever —23— toward the right hand stop —27— and free end of the lever —33— and upon the stationary incline —26— thus leaving the terminal end of the lever —23— free to be forced into contact with the terminal —6— to close the switch circuit as the plunger —8— and adjacent end of the walking beam —12— and lever —28— continues to descend, which latter action brings the lever —28— into contact with the rolling member —18— forcing it against and depressing the lever —19— and thereby rocking the terminal end of the lever —23— into contact with the terminal —6— through the medium of the link —22—.

In some instances, the switch —B— is adapted to close instantly upon the closing of its circuit while in other instances, such as the use of oil switches, the closing of such switch is somewhat retarded and later in its action than the closing of its actuating circuit and in order that the timing device may be adjusted itself to one or the other of said conditions, the relative positions of the incline —19— and lever —28— both as to length, distance apart, and incline are adjusted so that the rolling member 18 will be impinged between the two elements —19— and —28— earlier or later in its travel according to the conditions of speeds of the two machines A and C when approaching synchronism, it being understood that the rolling member 18 is prevented from movement along the incline 19 until the two machines are moving within a predetermined difference of speed at which it is safe to close the switch and being earlier or later in the stroke as predetermined by the operative position of the ball upon the incline and the form of switch employed. For example, if a quick closing switch is used the release of the rolling member is referred to later in the stroke and the incline of the levers and distance apart is so adjusted that the ball will travel quickly to the opposite end consequently closing the switch at the point of synchronism, while on the other hand if an oil switch is used, the ball should leave the pocket earlier in the stroke and the distance apart and incline of the levers so adjusted that the ball will be impinged in such position that will correspond to the difference in speeds of the two machines, the travel of the ball down the incline being limited by a suitable stop as for instance the toggle —37—.

In case of abnormal conditions of the two machines after the rolling member —18— has entered upon the incline —19—, the inter-position of the rolling member —25— between the levers —23— and —33— will operate to prevent the closing of the contact terminals —6— and —7—.

The roller —18— is returned to its normal starting position in the pocket —21— by the elevation of the left hand end of the lever —35— which is slotted throughout its length to receive the lever —19—, so that when the left hand end of the lever —35— is rocked upwardly sufficiently to incline toward its pivots —36—, it engages and lifts the ball or roller —18— from the lever —19— and causes such ball or roller to ride down inclined lever —35— into the pocket —21—. This upward tilting of the left hand end of the lever —35— is brought about by the raising of the plunger —8— when the machines are out of step or out of synchronism, thus causing the right hand end of the lever —12— to rock upwardly and similarly rocking the right hand end of the lever —28— in the same direction through the medium of the connection —30—, the left hand end of the lever —35— being tilted upwardly by the toggle connection —37—. The lower end of the link —22— is yieldingly connected to the lever —23— by a buffer spring —22'— which takes the downward thrust of the link —22— and prevents excessive strain on the terminal end —7— of the lever —23— against the contact terminal —6—.

In the operation of the device, keeping in mind that the object of the invention is to provide automatic means for closing the switch B when the machines, that is to say, the rotary converter and generator are approximately in step so that the converter may be driven by and in synchronism with the generator by the closing of said switch. Bearing in mind also that the solenoids D and D' are sufficiently sensitive to be influenced by the slightest variations in the instantaneous values of the voltage waves or number of alternations per minute of the two machines which are to be synchronized, it will be seen that the walking beam 12 constitutes primarily the moving power of the automatic switch closing mechanism. Now, as long as the two machines are driven at different speeds, this walking beam 12 will be oscillated by the solenoids in a more or less impulsive and unsteady manner and that when these machines approach synchronism of movement, the action of the lever will become slower and slower. Now, let it be supposed that the roller 18 is in the pocket 21 and that the lever 12 is oscillating impulsively. This will cause the lever 28 to oscillate impulsively in like manner and through the toggle 37, the lever 35 will be repeatedly jerked up from the stop 37', the long end of the lever acting to restore it to position on the stop when the toggle is broken, as shown in the figure. This will cause the roller 18 to be thrown up behind the stop 40 as the long arm of the lever 35 drops downward and permit it to be released to drop back in the pocket 21 as the long arm of the lever 35 moves upward. At the same time, the movement of the lever 28 will oscillate the lever 33 through the link 32. Now the tendency of the lever 28 is to have the end 7 move upward since the weight of the lever 19 and the connections 22 and 22' at all times tend to produce this result. However, by the rapid oscillation of the lever 12, the roller 25 is acted on by the lever 33 to constantly force the end 7 downward before the inertia has been fully overcome so that there is no contact between the end 7 and the contact point 6 at this time. When, however, the movement of the lever 12 becomes slow, the movement of the lever 33 will likewise become slow and the end 7 of the lever 23 will accordingly be raised to a greater height and thereby permit the pocket 21 to drop sufficiently far so that the movement of the lever 35 will act to cause the roller 18 to pass out of the pocket and roll down the lever 19. Thereupon, when the lever 12 is again acted on by the solenoid D, the roller will be caught between the levers 28 and 19 and the end 7 forced up against the contact 6 thereby closing the circuit and energizing the magnets 4 to close the switch B.

What I claim is:

1. In a synchronizer for rotary electric machines, an electric switch connected in circuit with said machines, a switch operating circuit and a circuit closer connected therewith, a tiltable inclined support 28, a rolling member upon said support, means actuated by variations in the relative instantaneous voltage values of said machines for controlling the movement of the inclined support and the rolling member therealong and means movable by said actuated means adapted for contact with said rolling member for controlling the action of the circuit closer.

2. In a synchronizer for rotary electric machines, an electric switch connected in circuit with said machines, a switch operating circuit and a circuit closer positioned therein, a tiltable support 28 and a rolling member adapted for movement therealong, means controlled by the change in the relative number of alternations per minute of said machines, and means movable by said controlled means adapted through engagement with said rolling member for controlling the action of the circuit closer.

3. In a synchronizer for rotary electric machines, a normally open electric switch connected in circuit with said machines, electrical operating means for said switch, a circuit closer connected in circuit with said means, a tiltable inclined support 28 and a rolling member adapted for movement therealong, electrically operated means controlled by the change in the relative voltage values and number of alternations per minute of said machines adapted for controlling the tilting of the inclined support and the movement of the rolling member thereon, and means movable by said electrically operated means adapted to contact said rolling member for controlling the action of the circuit closer.

4. In an automatic synchronizer for rotary electric machines, an electric circuit connecting the said machines, a switch in said circuit, an electrical operating circuit for said switch, a circuit closer in said operating circuit, an electrically operated means connected in the first named circuit controlled by the change in the relative voltage values and number of alternations per minute of the said machines, an inclined support and a rolling member movable therealong and a means carried by said electrically operated means and adapted for contacting said rolling means for controlling the action of the circuit closer.

5. In an automatic synchronizer for rotary electric machines, an electrically operated switch in circuit with said machines, a circuit closer in circuit with said switch, an inclined support 28, a rolling member mounted for movement upon said support, electrically operated means connected in circuit with said machines, contacting means movable by said operated means and adapted upon engagement by said rolling member in the path of movement thereof for operating the circuit closer.

In witness whereof I have hereunto set my hand this 7th day of August 1908.

RICHARD C. LEAKE.

Witnesses:
H. E. CHASE,
CAROLINE MCCORMACK.